(12) United States Patent
Chaudhary et al.

(10) Patent No.: US 9,367,467 B2
(45) Date of Patent: Jun. 14, 2016

(54) SYSTEM AND METHOD FOR MANAGING CACHE REPLACEMENTS

(71) Applicant: Nvidia Corporation, Santa Clara, CA (US)

(72) Inventors: Anurag Chaudhary, Santa Clara, CA (US); Guillermo Rozas, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 113 days.

(21) Appl. No.: 14/466,546

(22) Filed: Aug. 22, 2014

(65) Prior Publication Data

US 2016/0055087 A1 Feb. 25, 2016

(51) Int. Cl.
*G06F 12/02* (2006.01)
*G06F 12/08* (2016.01)
*G06F 12/12* (2016.01)

(52) U.S. Cl.
CPC ............ *G06F 12/0862* (2013.01); *G06F 12/12* (2013.01); *G06F 2212/1024* (2013.01); *G06F 2212/602* (2013.01); *G06F 2212/69* (2013.01)

(58) Field of Classification Search
CPC .............................. G06F 12/0862; G06F 12/12
USPC ................. 711/133, 137, 143, 154, 156, 168
See application file for complete search history.

(56) References Cited

U.S. PATENT DOCUMENTS

| | | | | |
|---|---|---|---|---|
| 5,809,524 A * | 9/1998 | Singh | .................... | G06F 12/123 711/118 |
| 6,578,111 B1 * | 6/2003 | Damron | .............. | G06F 12/0862 711/133 |
| 6,578,112 B2 * | 6/2003 | Ono | ..................... | G06F 12/0875 710/56 |
| 6,598,124 B1 * | 7/2003 | Damron | .............. | G06F 12/0862 711/133 |
| 6,629,188 B1 * | 9/2003 | Minkin | ..................... | G06T 1/60 345/552 |
| 6,772,295 B2 * | 8/2004 | Spencer | .............. | G06F 12/0862 711/137 |
| 6,851,010 B1 * | 2/2005 | Rao | ..................... | G06F 9/30047 711/118 |
| 6,918,009 B1 * | 7/2005 | Sato | .................... | G06F 12/0815 711/137 |
| 6,959,363 B2 * | 10/2005 | Southwell | ........... | G06F 12/0862 711/128 |
| 7,290,089 B2 * | 10/2007 | Parthasarathy | ..... | G06F 9/30181 711/118 |
| 7,797,493 B2 * | 9/2010 | Peters | ................. | G06F 12/0862 711/137 |
| 8,051,253 B2 * | 11/2011 | Okin | .................... | G06F 13/1684 711/100 |
| 8,996,815 B2 * | 3/2015 | Jones | .................. | G06F 12/0862 711/862 |

* cited by examiner

*Primary Examiner* — Stephen Elmore

(57) ABSTRACT

A system and method for managing cache replacements and a memory subsystem incorporating the system or the method. In one embodiment, the system includes: (1) a cache controller operable to control a cache and, in order: (1a) issue a pre-fetch command when the cache has a cache miss, (1b) perform at least one housekeeping task to ensure that the cache can store a replacement line and (1c) issue a fetch command and (2) a memory controller associated with a memory of a lower level than the cache and operable to respond to the pre-fetch command by performing at least one housekeeping task to ensure that the memory can provide the replacement line and respond to the fetch command by providing the replacement line.

20 Claims, 1 Drawing Sheet

SYSTEM AND METHOD FOR MANAGING CACHE REPLACEMENTS

TECHNICAL FIELD

Figure 1:
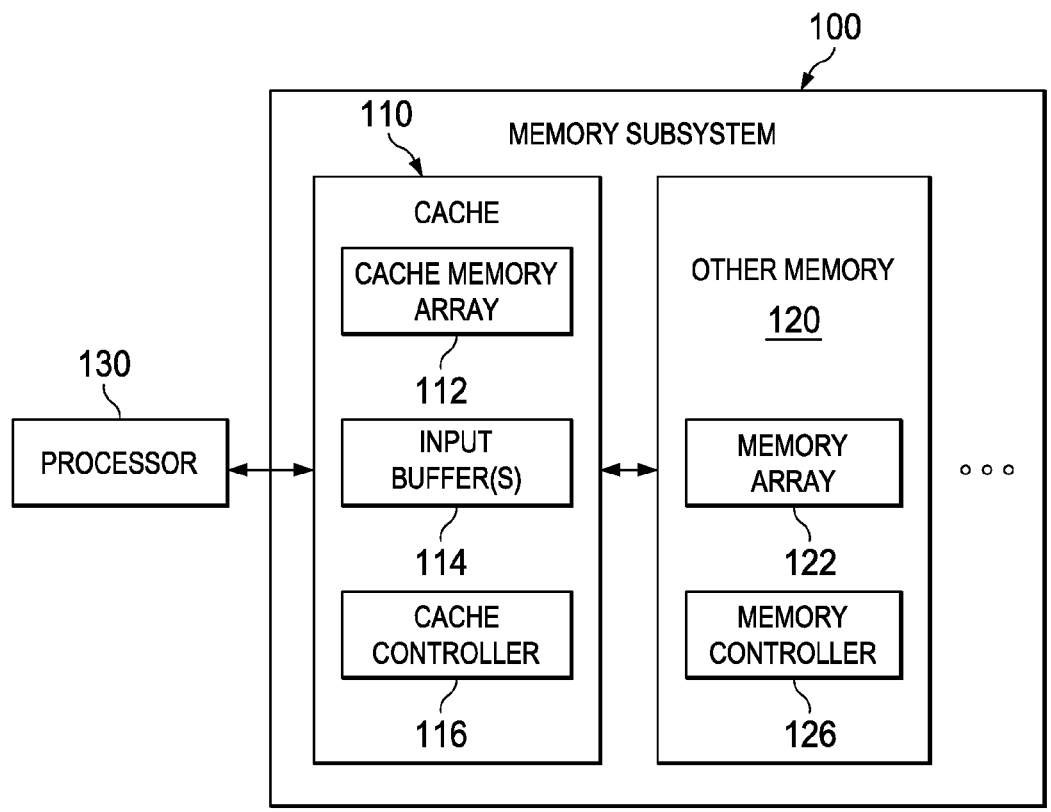

This application is directed, in general, to computer memory management and, more specifically, to a system and method for managing cache replacements.

BACKGROUND

Modern memory subsystems, such as those found in desktop, laptop and tablet computers, and even smartphones, employ a stratified memory architecture that divides memory into levels of different speeds and sizes. Stratified memory architectures are based on the fact that faster memory is more expensive than slower memory. Thus, a typical memory subsystem may have a very fast and small Level 1 cache, a larger but still fast Level 2 cache, an even larger but slower Level 3 cache and a far larger but far slower main memory. A central processing unit (CPU) or graphics processing unit (GPU) requests data from the memory subsystem as a whole. The memory subsystem is responsible for copying lines of data from the main memory to the Level 3 cache, to the Level 2 cache and to the level 1 cache as needed, with the goal of minimizing memory latency (most often expressed in clock cycles), or, stated another way, maximizing the hit rates of the Level 1, Level 2 and Level 3 caches.

Unfortunately, cache misses are essentially unavoidable. Cache misses also introduce substantial latency, because replacing a line of data in a cache involves not only making room for it in the cache to which it is being added, but also ensuring that it is able to be read from the next lower memory. In the worst case, data has to be copied from the lowest memory level all the way up to the Level 1 cache, and this can take hundreds if not thousands of clock cycles.

Fortunately, predictive replacement policy algorithms have been developed to increase cache hit rates, with the goal of replacing lines before they are requested. Furthermore, some cache memories are provided with input buffers, guaranteeing that they have room to receive a replacement line from the lower level.

SUMMARY

One aspect provides a system for managing cache replacements. In one embodiment, the system includes: (1) a cache controller operable to control a cache and, in order: (1a) issue a pre-fetch command when the cache has a cache miss, (1b) perform at least one housekeeping task to ensure that the cache can store a replacement line and (1c) issue a fetch command and (2) a memory controller associated with a memory of a lower level than the cache and operable to respond to the pre-fetch command by performing at least one housekeeping task to ensure that the memory can provide the replacement line and respond to the fetch command by providing the replacement line.

Another aspect provides a method of managing cache replacements. In one embodiment, the method includes: (1) first issuing a pre-fetch command when the cache has a cache miss, the pre-fetch command allowing at least one housekeeping task to be performed with respect to a memory of a lower level than the cache, (2) second, performing at least one housekeeping task to ensure that the cache can store a replacement line and (3) then issuing a fetch command.

Yet another aspect provides a memory subsystem. In one embodiment, the memory subsystem includes: (1) a lower-level memory having a memory array and a memory controller operable to respond to a pre-fetch command by performing at least one housekeeping task to ensure that the memory can provide a particular replacement line and respond to a fetch command by providing the particular replacement line and (2) a cache having a cache memory array and a cache controller operable to: first issue a pre-fetch command when the cache has a cache miss with respect to the particular replacement line, then perform at least one housekeeping task to ensure that the cache can store the particular replacement line, and then issue a fetch command requesting the particular replacement line.

BRIEF DESCRIPTION

Figure 2:
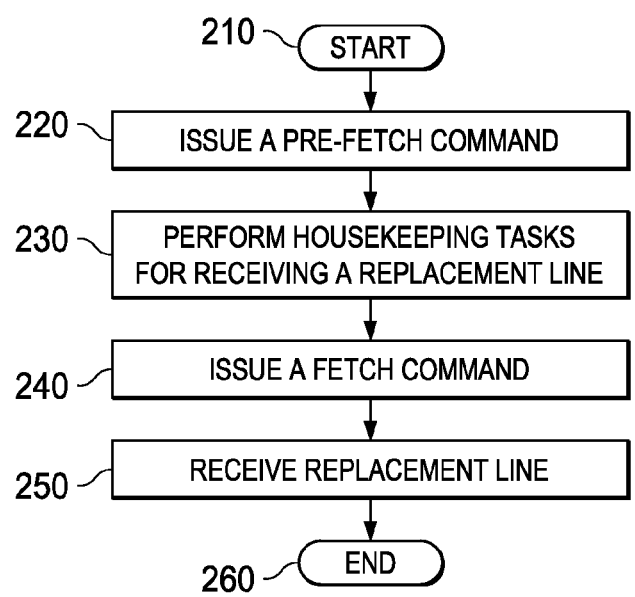

Reference is now made to the following descriptions taken in conjunction with the accompanying drawings, in which:

FIG. 1 is a simplified block diagram of a computer system incorporating a system for managing cache replacements; and FIG. 2 is a flow diagram of one embodiment of a method of managing cache replacements.

DETAILED DESCRIPTION

As stated above, predictive replacement policy algorithms and input buffers are improving memory latency. However, predictive replacement policy algorithms are not perfect in their predictions. Further, input buffers require additional space and consume additional power.

It is realized herein that further improvement is possible, particularly when considering the various "housekeeping" tasks that must be undertaken in both the cache that is to receive the replacement line and the memory that is to provide the replacement line. These housekeeping tasks are performed during "pre-fetch."

First, the cache that is to receive the line needs to ensure that it has space available to store the line when it receives it. Depending upon the specific architecture of the cache, this housekeeping may involve determining whether the input buffer is available and clearing it if it is not; writing back any data in the line being replaced (called the "victim line"); clearing any writeback buffers needed to write back the data; or evicting or snooping a line from a higher-level cache in the case of an inclusive cache. Any of these may render the cache temporarily unavailable to receive the replacement line.

Second, the memory that is to provide the replacement line (which may be the next lower cache level or main memory if the cache that is to receive the line is the lowest cache level) needs to ensure that it contains the line. Depending again upon the specific architecture of the memory, this housekeeping may involve determining if the line is contained in the memory and, if not, requesting a line from a still-lower level of memory.

The above are conventionally performed in the following order: when the cache that is to receive the line has a cache miss, it performs its housekeeping tasks, then issues a pre-fetch command to the memory from which it is to receive its replacement line. The memory, upon receiving the pre-fetch request, performs its housekeeping tasks, then signals its readiness to provide the replacement line. Then the cache issues a fetch command, and the memory responds by transmitting the replacement line to the cache. It is realized herein that this process takes more time than necessary.

It is realized herein that latency may be reduced by concurrently carrying out the housekeeping tasks in the cache and the memory. Thus, the following order is introduced: when the cache that is to receive the line has a cache miss, it issues a pre-fetch command to the memory from which it is to receive its replacement line, then performs its housekeeping tasks. The memory, upon receiving the pre-fetch request, performs its housekeeping tasks, then signals its readiness to provide the replacement line. Then the cache issues a fetch command, and the memory responds by transmitting the replacement line to the cache.

Introduced herein are various embodiments of a system and method for managing cache replacements. These embodiments will be described in the specific context of a computer system having a processor and at least two levels of memory. However, those skilled in the pertinent art will understand that the embodiments introduced herein apply to computer systems having more processors, more levels of memory and different processor or memory architectures.

FIG. 1 is a simplified block diagram of a computer system incorporating a system for managing cache replacements. The computer system includes a memory subsystem 100 and a processor 130, which may be a central processing unit (CPU), a graphics processing unit (GPU) or any other conventional or later-developed processor.

The memory subsystem 100 includes at least two levels of memory (i.e. at least a cache and a main memory): a cache 110 and other memory 120 that lies at a level immediately below that of the cache 110. In one embodiment, the cache 110 is a Level 1 cache, and the other memory 120 is a Level 2 cache. In another embodiment, the cache is a Level 2 cache, and the other memory 120 is a Level 3 cache. In yet another embodiment, the cache is a Level 3 cache, and the other memory 120 is main memory. In the embodiment of FIG. 1, the memory subsystem 100 includes further levels of memory, as unreferenced ellipses indicate. It should be noted that, while the unreferenced ellipses appear to indicate that the further levels of memory lie below the other memory 120. However, at least some of the other levels may lie above the cache 110.

The cache 110 includes a cache memory array 112, one or more input buffers 114 and a cache controller 116. The other memory 120 includes a memory array 122 and a memory controller 126. Those skilled in the pertinent art are familiar with the structure and function of cache controllers and memory controllers. Those skilled in the pertinent art are also familiar with the various housekeeping tasks that cache controllers should perform (depending upon the architecture of the memory subsystem and the memory arrays they are controlling) to ensure that they can safely store replacement lines received by them or provide replacement lines requested from them. These topics are outside the scope of the present disclosure. However, the order in which these tasks are performed relative to pre-fetch and fetch commands issued by the cache 110 for replacement lines from the other memory 120 is pertinent to the present disclosure.

It is assumed for purposes of describing FIG. 1 that the processor 130 has requested data from the memory subsystem 100 and that the data is not contained in a line of the cache 110, thus triggering a cache miss. The cache controller 116 is operable to respond to the cache miss by performing a series of steps in a novel order. First, the cache controller 116 is operable to issue a pre-fetch command when the cache has a cache miss with respect to a particular replacement line. Then, the cache controller 116 is operable to perform at least one housekeeping task to ensure that the cache can store the particular replacement line. In one embodiment, the at least one housekeeping task performable by the cache controller 116 includes ensuring that the one or more input buffers 114 are clear. Having begun at least a portion of at least one housekeeping task, the cache controller 116 is operable to issue a fetch command requesting the particular replacement line from the other memory 120. In the illustrated embodiment, the cache controller 116 is operable to complete all of the housekeeping tasks it needs to perform to ensure that it can store a received replacement line before issuing the fetch command.

The memory controller 126 is operable to respond to the pre-fetch command issued by the cache controller 116 by performing at least one housekeeping task to ensure that the memory 110 can provide the particular replacement line that will be the subject of a future request by the cache 110. In one embodiment, the at least one housekeeping task to be performed with respect to the memory 120 includes fetching the particular replacement line from a lower memory level if the replacement line is not already contained in the memory array 122. The memory controller 126 is further operable to respond to the eventual fetch command by providing the particular replacement line to the cache 110. The salient point is that the cache controller 116 and the memory controller 126 can both be engaged in housekeeping tasks concurrently. They need not be carried out serially as is the conventional practice.

FIG. 2 is a flow diagram of one embodiment of a method of managing cache replacements. The method begins in a start step 210. In a step 220, a pre-fetch command is issued from a cache when the cache has a cache miss before completing all housekeeping tasks required to guarantee that the cache is able to store a replacement line when it is received. In the illustrated embodiment, the pre-fetch command is issued before performing any housekeeping tasks required to guarantee that the cache is able to store a replacement line when it is received. The pre-fetch command allows at least one housekeeping task to be performed with respect to a memory of a lower level than the cache while one or more housekeeping tasks are performed with respect to the cache. In a step 230, at least one housekeeping task is performed with respect to the cache to ensure that the cache can store the replacement line. In a step 240, a fetch command is issued after performing that at least one housekeeping task. In the illustrated embodiment, the fetch command is issued when all housekeeping tasks required to guarantee that the cache is able to store a replacement line when it is received are completed. In a step 250, the replacement line is received and stored in the cache. The method ends in an end step 260.

Those skilled in the art to which this application relates will appreciate that other and further additions, deletions, substitutions and modifications may be made to the described embodiments.

What is claimed is:

1. A system for managing cache replacements, comprising:
a cache controller operable to control a cache and, in order:
  issue a pre-fetch command when said cache has a cache miss,
  perform at least one housekeeping task to ensure that said cache can store a replacement line, and
  issue a fetch command; and
a memory controller associated with a memory of a lower level than said cache and operable to respond to said pre-fetch command by performing at least one housekeeping task to ensure that said memory can provide said replacement line and respond to said fetch command by providing said replacement line.

2. The system as recited in claim 1 wherein said memory controller is a second cache controller and said memory is a second cache.

3. The system as recited in claim 1 wherein said cache controller is a Level 1 cache controller.

4. The system as recited in claim 1 wherein said cache includes at least one input buffer and said at least one housekeeping task performable by said cache controller includes ensuring that said at least one input buffer is clear.

5. The system as recited in claim 1 wherein said at least one housekeeping task performable by said cache controller includes at least one the group consisting of:
   writing back any data in a line being replaced,
   clearing any writeback buffers needed to write back said data, and
   evicting or snooping a line from a higher-level cache if said cache is an inclusive cache.

6. The system as recited in claim 1 wherein said at least one housekeeping task performable by said memory controller includes fetching said replacement line from a lower memory level.

7. The system as recited in claim 1 wherein said memory is a main memory.

8. A method of managing cache replacements, comprising:
   first issuing a pre-fetch command when said cache has a cache miss, said pre-fetch command allowing at least one housekeeping task to be performed with respect to a memory of a lower level than said cache;
   second, performing at least one housekeeping task to ensure that said cache can store a replacement line; and
   then issuing a fetch command.

9. The method as recited in claim 8 wherein said memory is a second cache.

10. The method as recited in claim 8 wherein said cache is a Level 1 cache.

11. The method as recited in claim 8 wherein said cache includes at least one input buffer and said performing said at least one housekeeping task includes ensuring that said at least one input buffer is clear.

12. The method as recited in claim 8 wherein said cache includes at least one input buffer and said performing said at least one housekeeping task includes at least one the group consisting of:
   writing back any data in a line being replaced,
   clearing any writeback buffers needed to write back said data, and
   evicting or snooping a line from a higher-level cache if said cache is an inclusive cache.

13. The method as recited in claim 8 wherein said at least one housekeeping task to be performed with respect to said memory includes fetching said replacement line from a lower memory level.

14. The method as recited in claim 8 wherein said memory is a main memory.

15. A memory subsystem, comprising:
   a lower-level memory having a memory array and a memory controller operable to respond to a pre-fetch command by performing at least one housekeeping task to ensure that said memory can provide a particular replacement line and respond to a fetch command by providing said particular replacement line; and
   a cache having a cache memory array and a cache controller operable to: first issue a pre-fetch command when said cache has a cache miss with respect to said particular replacement line, then perform at least one housekeeping task to ensure that said cache can store said particular replacement line, and then issue a fetch command requesting said particular replacement line.

16. The memory subsystem as recited in claim 15 wherein said memory controller is a second cache controller and said memory is a second cache.

17. The memory subsystem as recited in claim 15 wherein said cache controller is a Level 1 cache controller.

18. The memory subsystem as recited in claim 15 wherein said cache includes at least one input buffer and said at least one housekeeping task performable by said cache controller includes ensuring that said at least one input buffer is clear.

19. The memory subsystem as recited in claim 15 wherein said at least one housekeeping task performable by said cache controller includes at least one the group consisting of:
   writing back any data in a line being replaced,
   clearing any writeback buffers needed to write back said data, and
   evicting or snooping a line from a higher-level cache if said cache is an inclusive cache.

20. The memory subsystem as recited in claim 15 wherein said at least one housekeeping task performable by said memory controller includes fetching said replacement line from a lower memory level.

* * * * *